Jan. 23, 1934.  L. EMANUELI  1,944,637
APPARATUS FOR LOCATING OIL LEAKS IN CABLES
Filed July 22, 1931  2 Sheets-Sheet 1

Luigi Emanueli, Inventor,
By Emil Bönnelycke
Attorney

Jan. 23, 1934.   L. EMANUELI   1,944,637
APPARATUS FOR LOCATING OIL LEAKS IN CABLES
Filed July 22, 1931   2 Sheets-Sheet 2
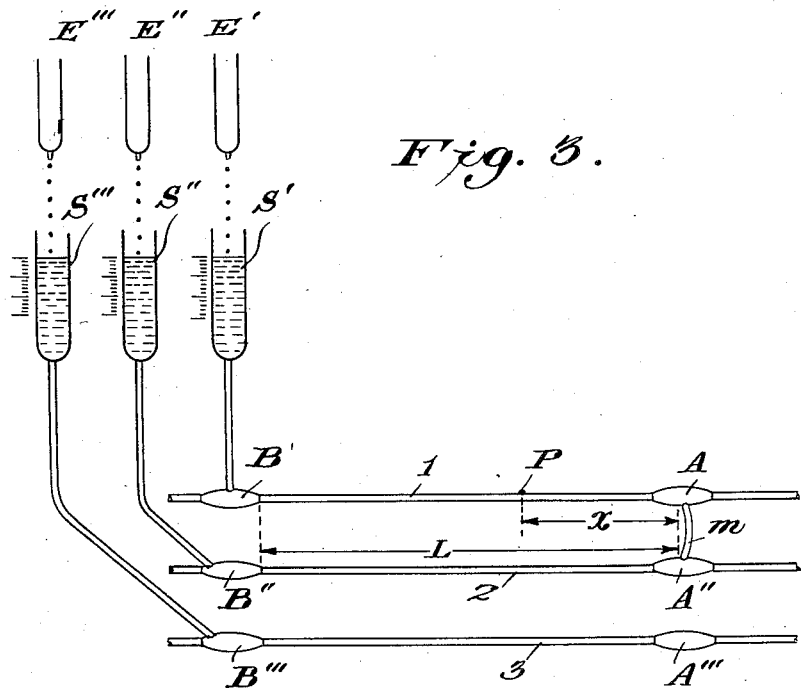
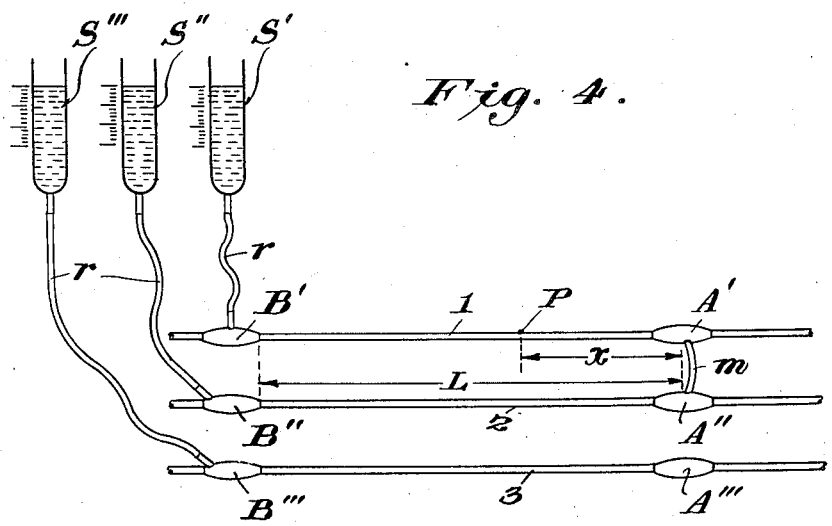
Luigi Emanueli, INVENTOR
BY
Stone, Boyden, Mack & Hahn
ATTORNEYS Patented Jan. 23, 1934

1,944,637

UNITED STATES PATENT OFFICE 1,944,637

APPARATUS FOR LOCATING OIL LEAKS IN CABLES

Luigi Emanueli, Milan, Italy, assignor to Societá Italiana Pirelli, Milan, Italy Application July 22, 1931, Serial No. 552,535, and in Italy April 15, 1931

6 Claims. (Cl. 137—77)

This invention has for its object an apparatus for locating the point where there is a leakage of oil through the lead sheath of a cable belonging to a system of three single-core cables filled with oil and laid parallel near to each other. This localization is based on the comparison between the quantity of oil lost from two small volumetric reservoirs which feed the leak from two different parts.

Figure 1:
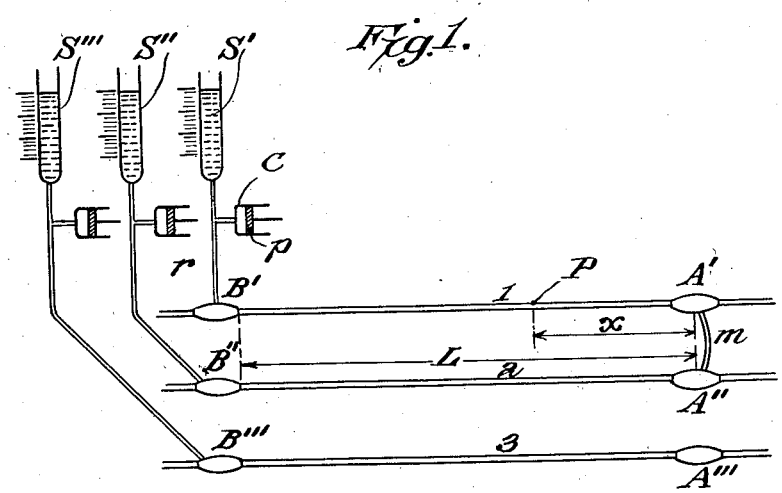
Figure 2:
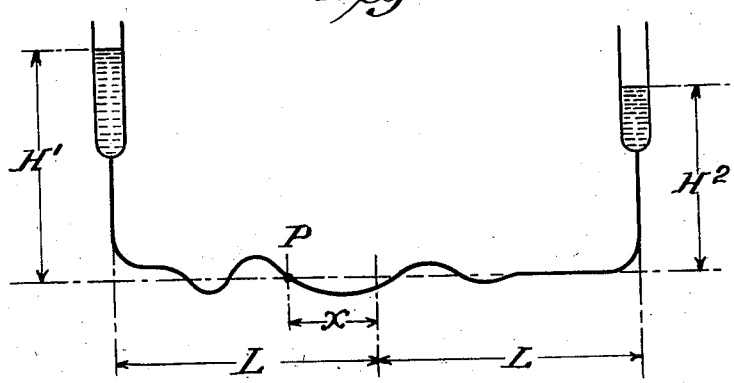

The attached drawings clearly show the essence of the invention. In Figure 1, as an example, a three phase line, on which the apparatus according to this invention is mounted, is represented schematically. Figure 2 shows schematically the elements which enter into the calculations which have to be established for fixing the point where the leak has occurred. Figure 3 shows schematically a modification of the invention; and Figure 4 shows schematically still another modification.

In Figure 1, the three single phase cables constituting the line are indicated by 1, 2 and 3. The consecutive sections are connected together by means of so-called stop joints A', B'; A'', B''; etc., which, while they insure the electric continuity of the conductors, interrupt the passage of the oil between two consecutive sections. These stop joints also allow, by means of special openings, the communication of the oil in the cable with the exterior.

Let us suppose that the leakage of oil occurs at the point P of cable 1. Let us call L the total length, in feet, of the section, including the fault P, and $x$ the unknown distance, in feet, of said fault from one end of the section.

To effect the measurement, the leaky cable 1 is first connected to one of the other two good cables, for instance cable 2, by means of a connection $m$ between the respective stop joints A', and A'', while at the other end of the section the apparatus forming the object of this invention is installed. This comprises two small volumetric reservoirs, constituted opportunely by two calibrated glass tubes S' and S'', which are connected to cables 1 and 2, respectively, through the joints B' and B''. The above-mentioned tubes S' and S'' are filled with oil, the level of which can be varied during the measurement by means of one of the devices described later. The oil lost through the leakage P comes, therefore, from one part directly through the tube S' and from the other through the tube S'', by means of the connection $m$.

The resulting hydrostatic arrangement can be represented by Figure 2. Let us call:

$H_1$ and $H_2$ the hydrostatic height of the level of oil in the two tubes with respect to the point P.

$Q_1$ and $Q_2$ the variation in cubic feet of the quantity of oil contained respectively in the two tubes during the time $t$ of the measurement.

$Q_3$ the amount in cubic feet of oil lost through the leak.

R the resistance of the leak to the flow of oil.

$b$ the coefficient of friction on the oil in the conductor of the cable, which is supposed to be independent of the hydrostatic height.

We can then write—

$$H_1 = \frac{dQ_1}{dt}(L-x)b + \frac{dQ_3}{dt}R$$

$$H_2 = \frac{dQ_2}{dt}(L+x)b + \frac{dQ_3}{dt}R$$

therefore—

$$H_1 - H_2 = \frac{dQ_1}{dt}(L-x)b - \frac{dQ_2}{dt}(L+x)b$$

integrating, we obtain—

$$\int (H_1 - H_2)dt = Q_1(L-x)b - Q_2(L+x)b$$

If it is so arranged that the level of the oil in the two tubes fulfills the condition—

$$\int (H_1 - H_2)dt = 0$$

we will have—

$$Q_1(L-x)b = Q_2(L+x)b$$

therefore—

$$\frac{Q_1}{Q_2} = \frac{L+x}{L-x} \qquad (1)$$

from which, knowing $Q_1$ and $Q_2$, the distance $x$, from a point A' to the point where leakage occurs, can easily be found.

The above conditions regarding the level of the oil in the two tubes can be satisfied in various ways, for example by maintaining said level equal in the two tubes, though variable with the time, or by maintaining it constant and equal in the two tubes.

In order to obtain one or other of these results, the different dispositions represented in Figs. 1, 3 and 4 can, according to this invention, be used or other similar dispositions derived from them. One can, for example, as shown in Fig. 1, connect the two tubes S' and S'' at the base to a small cylinder $c$, supplied with a small piston $p$; the movement which must be made to this latter so that the level of the oil is kept level or behaves as desired in the two tubes can easily be measured and is proportional to $Q_1$ and $Q_2$.

Another procedure, as shown in Fig. 3, consists in feeding the two tubes S' and S'' from two small tanks E' and E'', then measuring the quantity of oil supplied by these latter; or as shown in Fig. 4, the two tubes S' and S'' can be connected to the respective cables 1 and 2 by means of flexible tubing $r$ so that said tubes can be raised or lowered until the level of the oil remains constant in the two tubes or behaves as desired. The movement that it has been necessary to make in the two tubes, which is easily measurable, will be proportional to the quantities of oil $Q_1$ and $Q_2$ respectively.

Measurements made under these conditions will not, however, give exact results because the variation of the temperature to which the cables are subjected during the time of measuring may cause considerable variations of the quantity of oil $Q_1$ and $Q_2$ supplied from the two tubes S' and S'', independent of their hydrostatic height. A correction of the values as determined above is therefore necessary; this can be obtained by using also cable 3 for the measurement. This third cable is connected, as the other two, to a calibrated glass tube S''' identical to the above-mentioned tubes S' and S'', while the other end of the cable is kept closed.

The oil in said tube S''' is, during the measurement, maintained at the same level as that in the two tubes S' and S'', by means of one of the arrangements described above. The quantity of oil $q'''$, measured in cubic feet, which must in this case be added or withdrawn from the tube S''' evidently depends only upon the variations of temperature which occur while the measurement is being made; that is, $f(T)$ being a function of the temperature, measured in degrees Fahrenheit, we have—

$$q'''=f(T)$$

These variations of temperature naturally influence in equal measure the quantity $Q_1$ and $Q_2$ of the two cables 1 and 2, so that, indicating with $q'$ and $q''$ the total variations of volume in cubic feet, in the two tubes respectively, due to the variations of temperature and to the variations $Q_1$ and $Q_2$ considered above, we can write—

$$q'=Q_1+f(T)=Q_1+q''' \text{ therefore } Q_1=q'-q'''$$
$$q''=Q_2+f(T)=Q_2+q''' \text{ therefore } Q_2=q''-q'''$$

The equation (1) will then become—

$$\frac{q'-q'''}{q''-q'''}=\frac{L+x}{L-x}$$

from which, knowing $q'$, $q''$ and $q'''$, we can determine the distance $x$ from the point A' to the point where leakage occurs.

It is opportune to point out that the apparatus which is the object of this invention can also be connected to terminals instead of to stop joints, as in the example described above. This will occur in the case where the cable line constitutes only one section for each phase, or in the case where the leakage occurs at one of the end sections of the line.

I claim as my invention:—

1. Apparatus for locating the point where a leakage of oil occurs through a hole in the lead sheath of a cable belonging to a system of three single-phase, oil-filled cables laid parallel and near to each other, comprising two volumetric feeding reservoirs filled with oil and connected respectively to the leaky cable and to one of the good cables, the other ends of said cables being connected together, said reservoirs being provided with means for measuring the variations which occur in a given time in the quantity of oil contained in them, from the determination of which the point of leakage can be located in the equation $$\frac{Q_1}{Q_2}=\frac{L+x}{L-x}$$

where $Q_1$ and $Q_2$ are variables and L is a constant.

2. Apparatus as set forth in claim 1, wherein each feeding reservoir comprises a calibrated tube, in which determined quantities of oil can be added or withdrawn from the exterior.

3. Apparatus as set forth in claim 1, wherein each volumetric reservoir comprises a calibrated tube connected to a cable and having an oil level restoring cylinder provided with a piston, interposed between a reservoir and a cable, the movement of said piston in said cylinder determining the quantity of oil which must be added or withdrawn in order to maintain the level in the reservoir at the desired level.

4. Apparatus for locating the point where a leakage of oil occurs through a hole in the lead sheath of a cable belonging to a system of three single-phase, oil-filled cables laid parallel and near to each other, comprising two volumetric feeding reservoirs filled with oil and connected respectively to the leaky cable and to one of the good cables, the other ends of said cables being connected together, said reservoirs being provided with means for measuring the variations which occur in a given time in the quantity of oil contained in them, a third volumetric oil reservoir connected to one of the ends of the third cable, the other end of the third cable being kept closed, and means cooperating with the third reservoir for determining the variation in the quantity of oil contained therein caused by the variation of the temperature, from the determination of which the point of leakage can be located in the equation $$\frac{q'-q'''}{q''-q'''}=\frac{L+x}{L-x}.$$

where $q'$ and $q''$ are variables, $q'''$ is a function of the temperature and L is a constant.

5. The method of locating the position of a leak in one of two similar adjacent lengths of fluid filled cable which comprises connecting the cables together at one end, continuously feeding fluid under the same hydrostatic head separately into the other end of each of the cable lengths, and comparing the amounts of fluid thus fed to the respective cable lengths in a given time.

6. The method of locating the position of a leak in one of three similar adjacent lengths of fluid filled cable which comprises connecting the leaky cable and one of the good cables together at one end, closing one end of the other good cable, continuously feeding fluid under the same hydrostatic head separately into the other end of each of the cable lengths, and comparing the amounts of fluid thus fed to the respective cable lengths in a given time, said amounts having first been corrected for temperature variations to which said cables are subjected during the time of comparison.

LUIGI EMANUELI.